US008806449B2

(12) United States Patent
Bates (10) Patent No.: US 8,806,449 B2
(45) Date of Patent: *Aug. 12, 2014

(54) HOLDING THREADS IN A SOFTWARE DEBUGGER

(71) Applicant: International Business Machines Corporation, Armonk, NY (US)

(72) Inventor: Cary L. Bates, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 53 days.

This patent is subject to a terminal disclaimer.

(21) Appl. No.: 13/709,136

(22) Filed: Dec. 10, 2012

(65) Prior Publication Data

US 2013/0097588 A1    Apr. 18, 2013

Related U.S. Application Data

(63) Continuation of application No. 12/938,492, filed on Nov. 3, 2010, now Pat. No. 8,495,589.

(51) Int. Cl.
*G06F 9/44*    (2006.01)

(52) U.S. Cl.
USPC ............ 717/129; 717/124; 717/127; 717/128

(58) Field of Classification Search
None
See application file for complete search history.

(56) References Cited

U.S. PATENT DOCUMENTS

| 6,681,384 | B1 * | 1/2004 | Bates et al. | 717/129 |
| 7,689,867 | B2 * | 3/2010 | Rosenbluth et al. | 714/34 |
| 2007/0226740 | A1 * | 9/2007 | Li et al. | 718/102 |
| 2007/0288907 | A1 * | 12/2007 | Olivier et al. | 717/129 |

OTHER PUBLICATIONS

Natasha Jarymowcyz, "Valid Debugging for Distributed Shared Memory", 2002, Department of Computer Science The College of William and Mary Williamsburg VA.*

Natasha Jarymowycz, "Valid Debugging for Distributed Shared Memory", Department of Computer Science The College of William and Mary, Williamsburg VA, Apr. 29, 2002.

* cited by examiner

*Primary Examiner* — Lewis A Bullock, Jr.
*Assistant Examiner* — Mark Gooray
(74) *Attorney, Agent, or Firm* — Martin & Associates, LLC; Derek P. Martin (57) ABSTRACT

A debugger includes a thread holding mechanism that analyzes the code being executed by multiple threads, and delays holding each thread that is currently executing system code external to the program until the thread is no longer executing the system code external to the program, or until some threshold is exceeded. Delaying holding of a thread that is executing system code external to the program avoids potential conditions that could lock up the debugger.

8 Claims, 6 Drawing Sheets

HOLDING THREADS IN A SOFTWARE DEBUGGER

BACKGROUND

1. Technical Field

This disclosure generally relates to debuggers, and more specifically relates to holding threads in debuggers.

2. Background Art

Computer systems have evolved into extremely sophisticated devices, and may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

As the sophistication and complexity of computer software increase, the more difficult the software is to debug. Debugging is the process of finding problems, or "bugs", during the development of a computer program. Most modern programming environments include a debugger that provides tools for testing and debugging a computer program. Debuggers allow setting breakpoints in a computer program. When a breakpoint is encountered, execution of the computer program is halted to allow inspecting the state of the computer program, or to allow executing instructions one at a time in a single step mode.

When debugging a computer program that includes multiple threads, a debugger typically halts and holds all threads when the debugger stops execution of the computer program. This can lead to conditions that can create a deadlock under certain circumstances. A program can make calls to the operating system to perform services on behalf of the program. A debugger also makes such calls to the operating system. When the debugger holds all threads for a program, if one of the threads is executing system code that is needed by the debugger, the result is a deadlock.

Similar deadlock problems can arise when building an environment such as UNIX on top of an existing operating system. The underlying operating system may have a concurrency control mechanism called a mutex. Because the UNIX System Services kernel is implemented above the underlying operating system, it cannot interrupt a thread waiting on one of these concurrency mechanisms. In some systems such as the zOS operating system by IBM, this low level concurrency mechanism is called a latch.

When a stop occurs, let's assume a thread is held within one of these critical sections of the underlying operating system that are guarded with a latch, and one of the threads waiting on the latch turns out to be the current or focus thread of the debugger. This means that when the debugger sends requests to the USS kernel, that kernel will have to run some amount of code to satisfy the request within the current or focus thread. But if this thread is waiting on a latch then the kernel can not interrupt it to run the code needed to satisfy the request. The result is that the kernel code is queued up on the latch which will never be released because the thread that is holding it is held by the debugger and the debugger hangs due to this deadlock condition.

Without a way to resolve these deadlock conditions described above, known debuggers will periodically lock up when the debugger waits for a thread executing system code that has already been halted by the debugger.

BRIEF SUMMARY

A debugger includes a thread holding mechanism that analyzes the code being executed by multiple threads, and delays holding each thread that is currently executing system code until the thread is no longer executing the system code, or until some threshold is exceeded. Delaying holding of a thread that is executing system code avoids potential conditions that could lock up the debugger.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The claims and disclosure herein provide a debugger that includes a thread holding mechanism that analyzes threads that are currently executing, and delays holding any thread that is executing system code. In the most preferred implementation, the debugger delays holding any thread that is executing system code until the thread is no longer executing system code. In an alternative implementation, the debugger delays holding any thread that is executing system code until either the thread is no longer executing system code, or some threshold is exceeded, at which time the debugger holds the thread. By delaying holding threads that are executing system code, potential deadlock conditions in the debugger are avoided.

Figure 1:
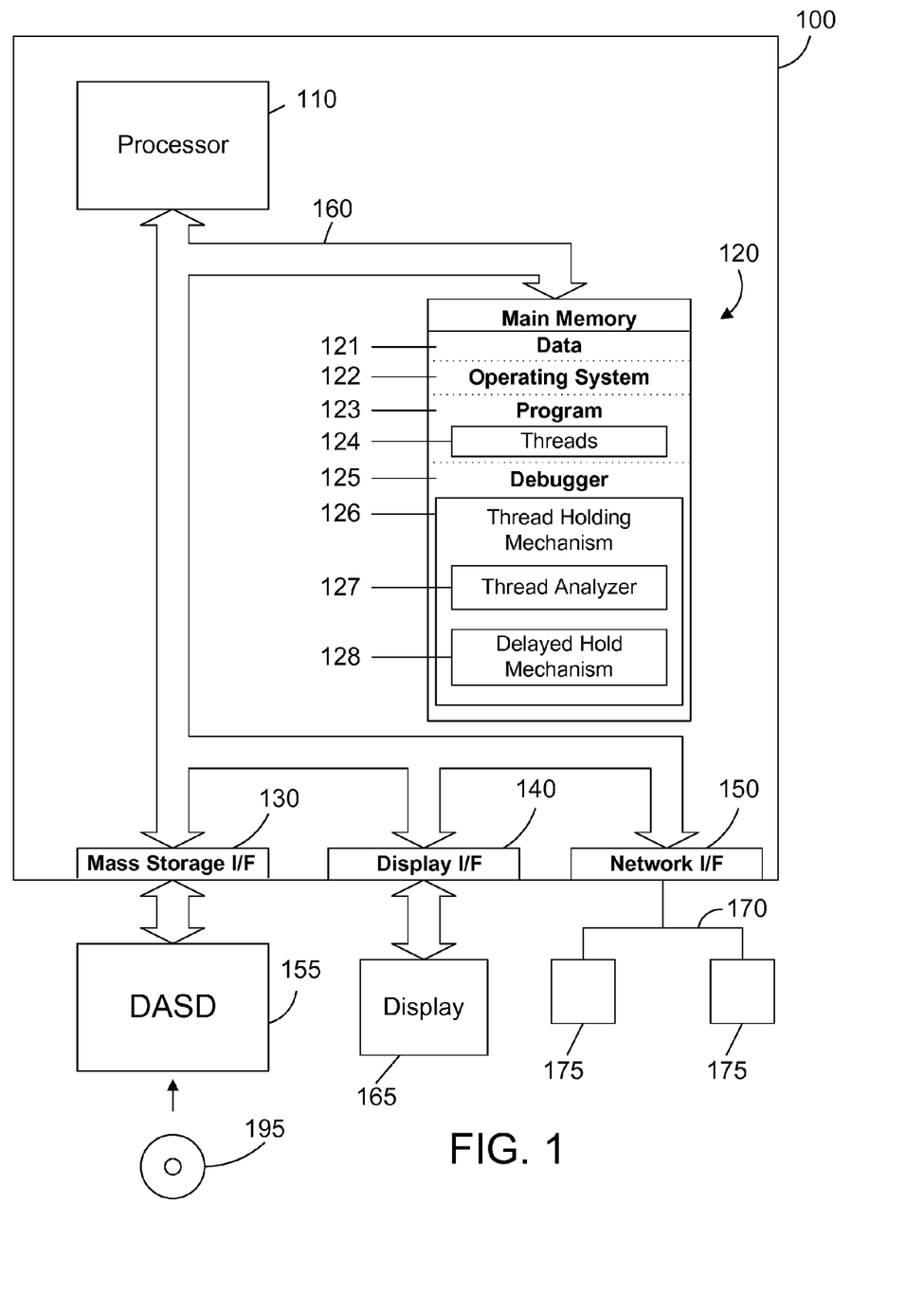
FIG. 1 is a block diagram of an apparatus that includes a thread holding mechanism that delays holding of threads that are executing system code.

Referring to FIG. 1, a computer system 100 is one suitable implementation of a computer system that includes a debugger with a thread holding mechanism. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122, a program 123, and a debugger 125. Data 121 represents any data that serves as input to or output from any program in computer system 100. Operating system 122 is a multitasking operating system. Program 123 is any code that needs to be debugged, whether the code is a complete application, a module, or some subset of an application or module. Program 123 preferably supports multiple threads of execution, shown in FIG. 1 as threads 124. The debugger 125 includes a thread holding mechanism 126 that includes a thread analyzer 127 and a delayed hold mechanism 128. The thread analyzer 127 analyzes the state of the threads 124 and determines whether each thread is executing system code. The delayed hold mechanism 128 delays holding each thread 124 that is executing system code until either the thread is no longer executing system code, or some threshold is exceeded. By delaying holding threads that are executing system code, potential deadlock conditions in the debugger are avoided.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, program 123 and debugger 125 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the debugger 125, and executes the threads 124 of the program 123 under control of the debugger 125.

Although computer system 100 is shown to contain only a single processor and a single system bus, those skilled in the art will appreciate that a thread holding mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
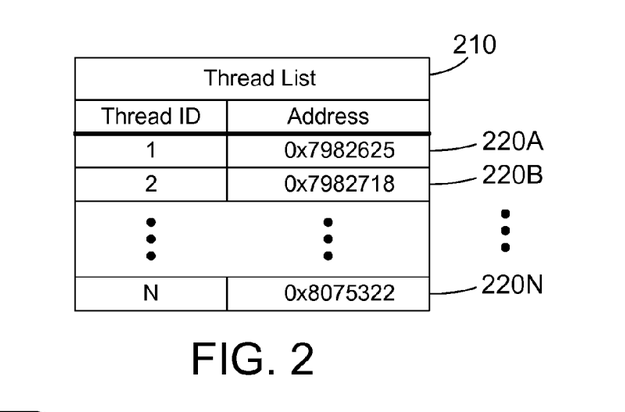
FIG. 2 is a block diagram of a thread list.

Referring to FIG. 2, a thread list 210 is built by the debugger to determine how to hold the threads currently executing the program. The thread list 210 includes a plurality of entries, shown in FIG. 2 as 220A, 220B, . . . , 220N. Each entry in the thread list 210 preferably includes a thread ID and an address that indicates the code the thread is currently executing. Thus, the entry 220A for Thread 1 shows Thread 1 is currently executing at address 0x7982625. The entry 220B for Thread 2 shows Thread 2 is currently executing at address 0x7982718. The entry 220N for Thread N shows Thread N is currently executing at address 0x8075322. The thread list is used by the debugger to define the code being executed by each thread. Because the debugger knows the addresses of the program being debugged, the debugger can readily tell from the address a thread is currently executing whether the thread is executing user code (the program) or system code external to the program.

Of course, there are other ways for the debugger to determine whether a thread is executing user code or system code. For example, the debugger could examine the name of the routine on the call stack. If the name is path qualified, it may also be possible to look for system directories to determine when system code is being executed. The disclosure and claims herein expressly extend to any suitable way to determine whether a thread is executing user code or system code.

Figure 3:
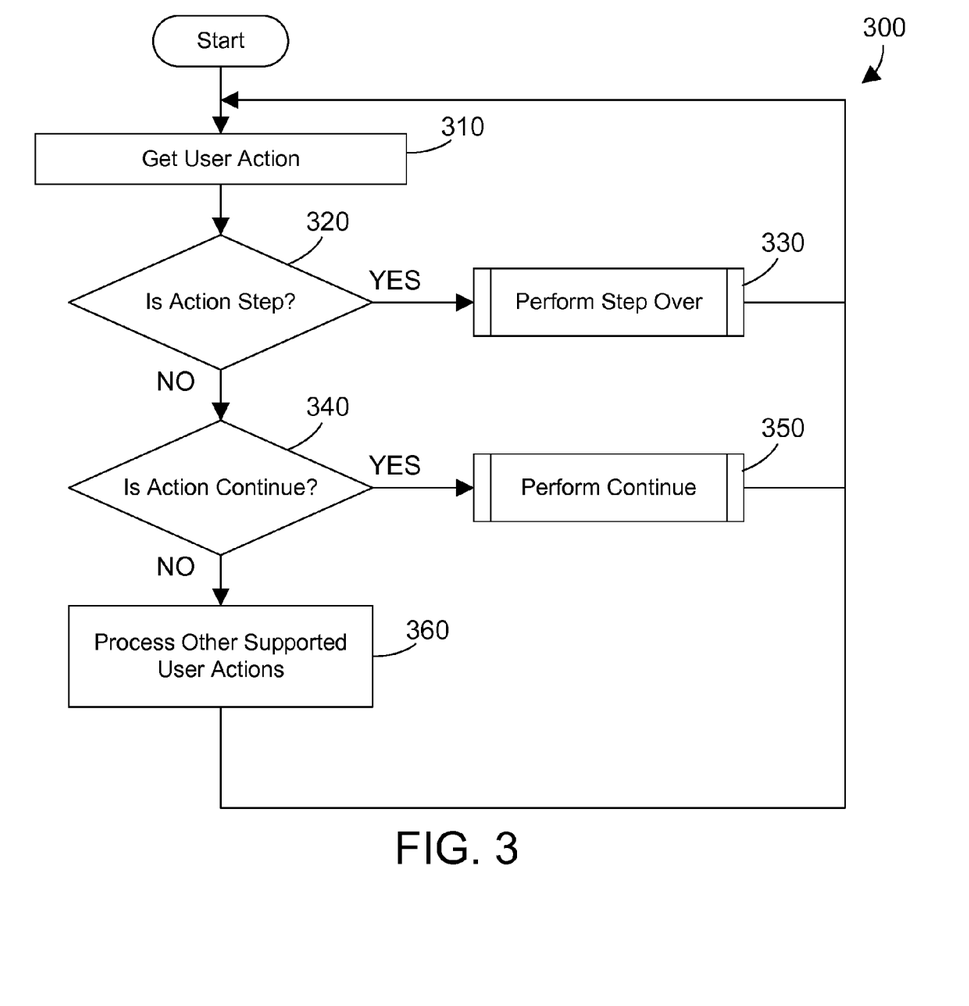
FIG. 3 is a flow diagram of a method for a debugger to perform user actions.
Figure 4:
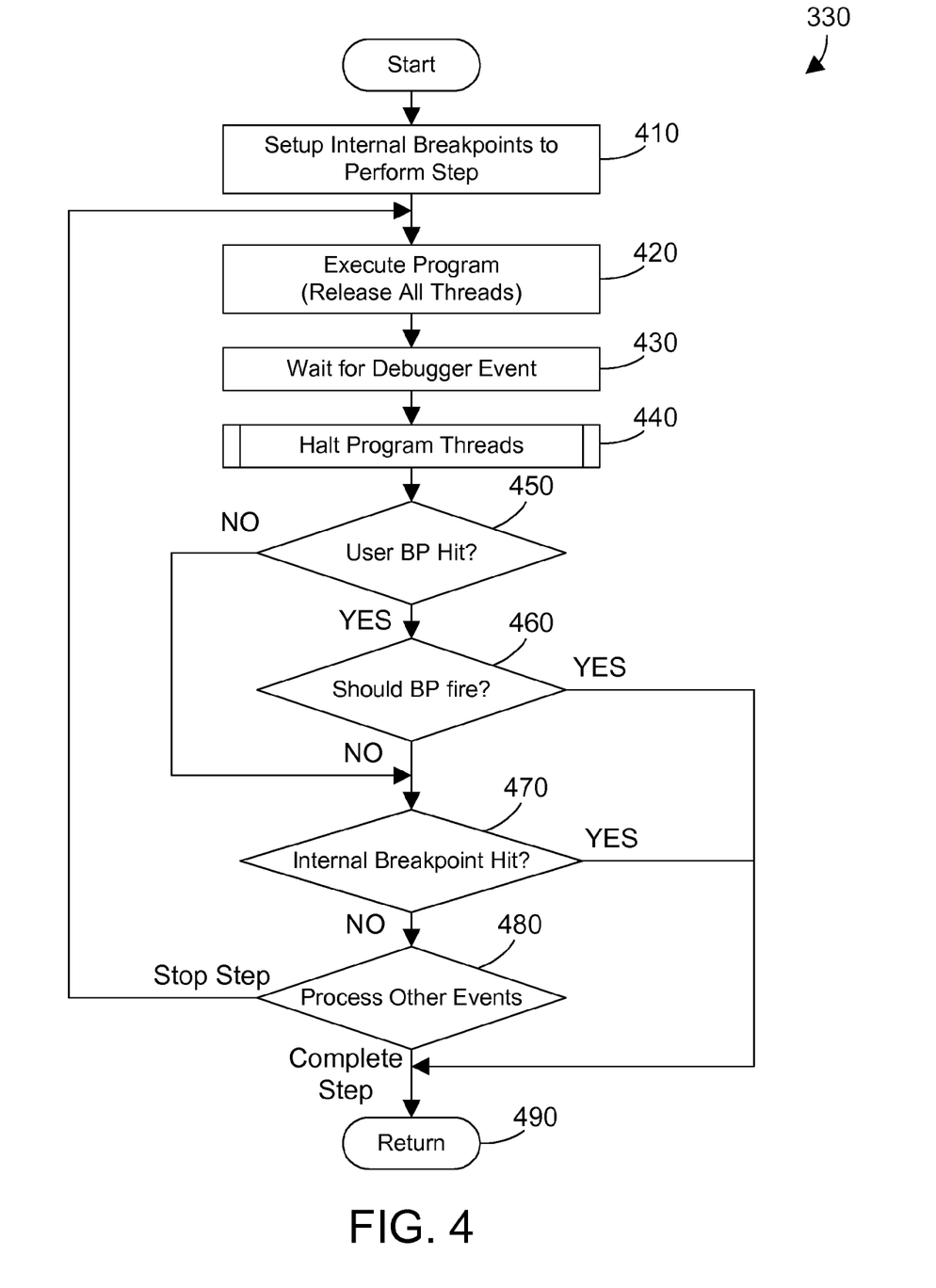
FIG. 4 is a flow diagram of one suitable implementation of step 330 in FIG. 3.
Figure 5:
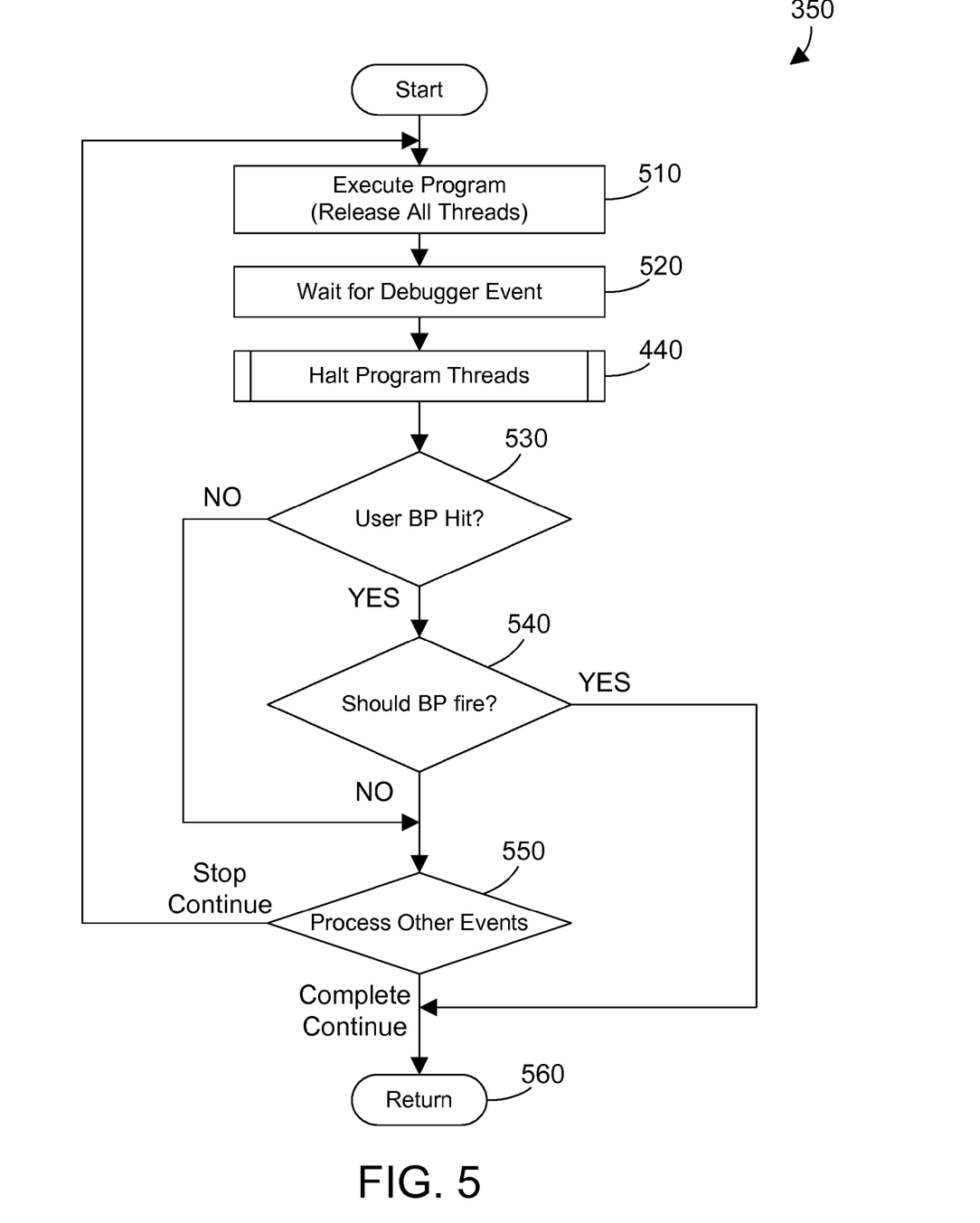
FIG. 5 is a flow diagram of one suitable implementation of step 350 in FIG. 3.

Referring to FIG. 3, a method 300 represents steps performed by the debugger 125 in FIG. 1. The debugger gets a user action (step 310). If the action is a step (step 320=YES), the debugger performs the step over function (step 330), and returns to get the next user action (step 310). Details of the step over function are shown in FIG. 4 and are discussed below. If the action is not a step (step 320=NO), and if the action is a continue (step 340=YES), the debugger performs the continue function (step 350). Details of the continue function are shown in FIG. 5 and are discussed below. If the action is not a step (step 320=NO), and if the action is not a continue (step 340=NO), the debugger processes the user action (step 360), as is known in the art.

Figure 6:
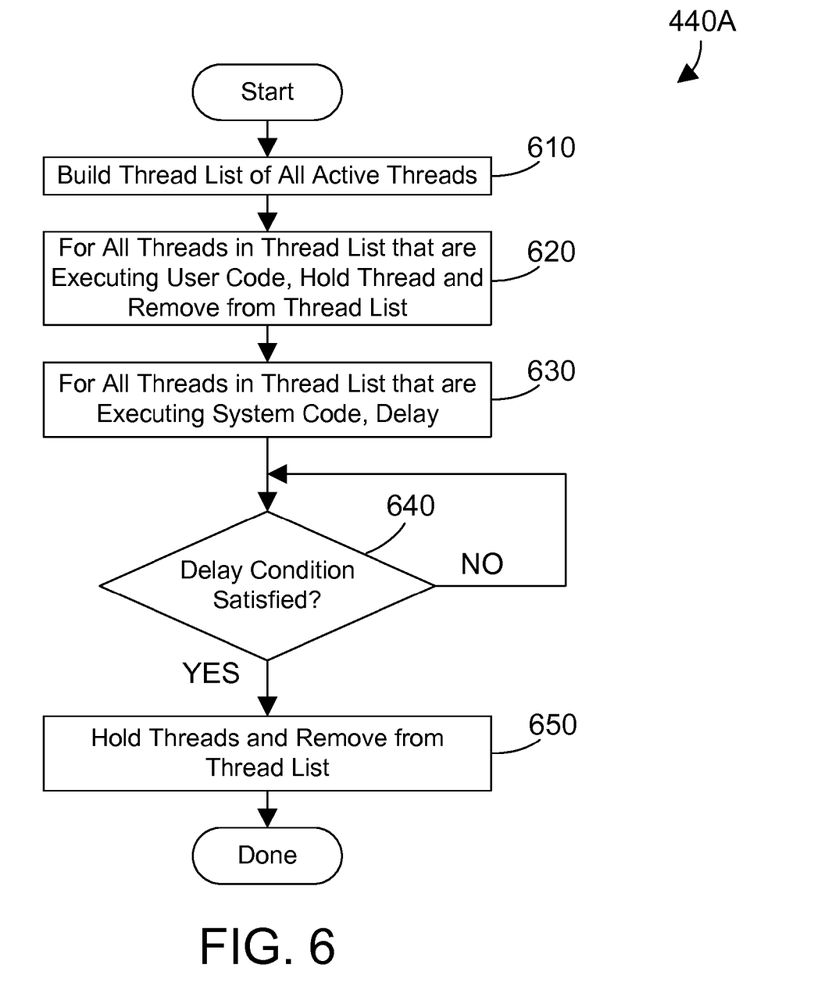
FIG. 6 is a flow diagram of a first suitable implementation of step 440 in FIGS. 4 and 5.
Figure 8:
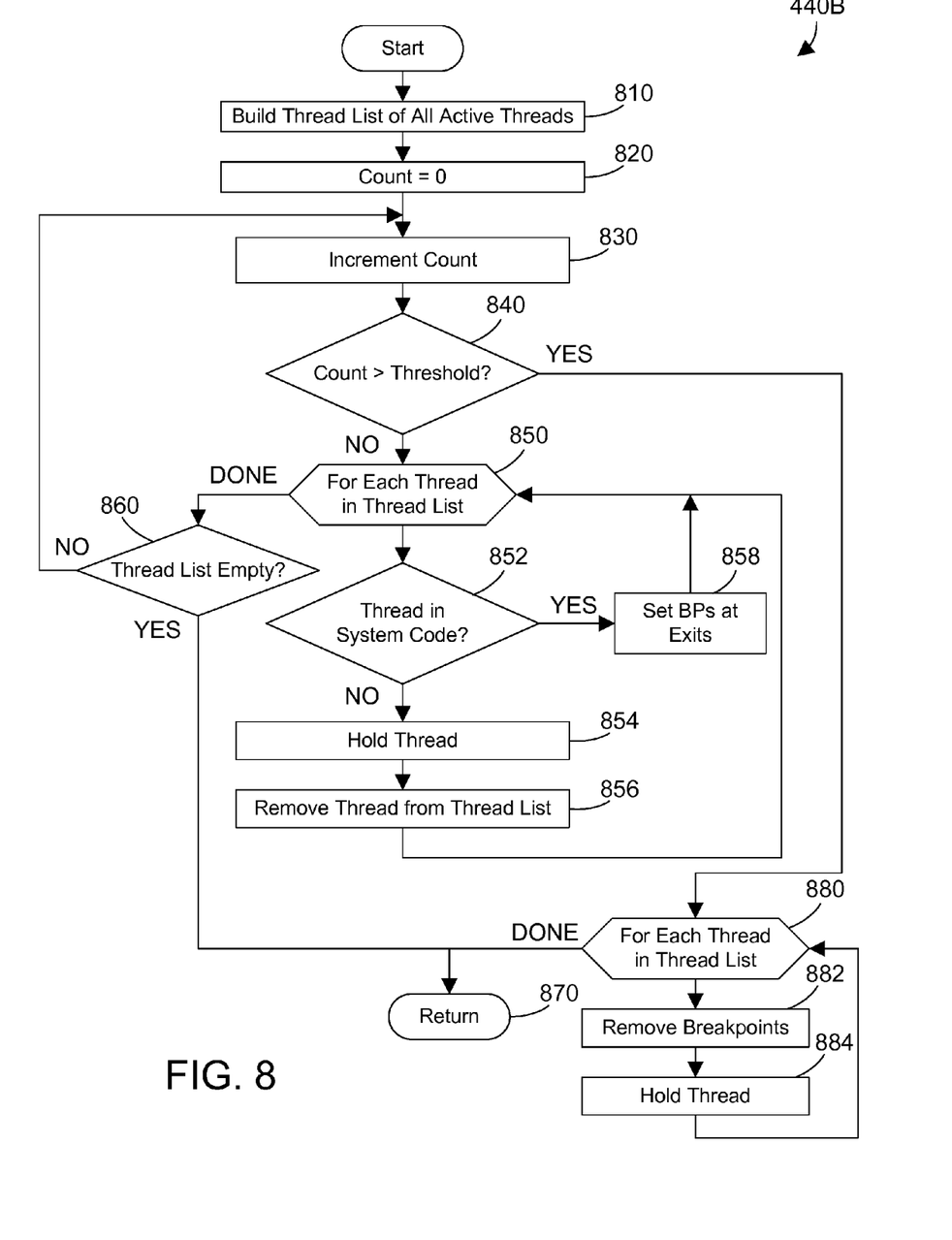
FIG. 8 is a flow diagram of a second suitable implementation of step 440 in FIGS. 4 and 5.

Referring to FIG. 4, one suitable implementation of the step over function shown as step 330 in FIG. 3 is shown by method 330 in FIG. 4. The debugger sets up internal breakpoints to perform the step function (step 410). The program is then executed, which means all threads are released by the debugger (step 420). The debugger then waits for a debugger event (step 430). When a debugger event occurs, the debugger halts the program threads (step 440). Two specific implementations for halting the program threads are shown in FIGS. 6 and 8, and are discussed in more detail below. If the debugger event is a user breakpoint hit (step 450=YES), and if the breakpoint should fire (step 460=YES), method 330 returns (step 490). If the debugger event is a user breakpoint hit (step 450=YES), and the breakpoint should not fire (step 460=NO), method 330 checks to see if the event is an internal breakpoint hit (step 470). If so (step 470=YES), method 330 returns (step 490). If not (step 470=NO), the other event is processed (step 480). If the event should stop the step by the debugger (step 480=Stop Step), method 330 loops back to step 420 and continues. If the event should allow completion of the step (step 480=Complete Step), method 330 returns (step 490). If the debugger event was not a user breakpoint hit (step 450=NO), method 330 goes to step 470 to determine whether an internal breakpoint was hit. If the debugger event was an internal breakpoint hit (step 470=YES), method 330 returns (step 490). If the debugger event was not an internal breakpoint hit (step 470=NO), the event is processed in step 480 as described above.

Referring to FIG. 5, one suitable implementation of the continue function shown as step 350 in FIG. 3 is shown by method 350 in FIG. 5. The debugger executes the program, which means all threads are released (step 510), and waits for a debugger event (step 520). When a debugger event occurs, the debugger then halts the program threads (step 440). Two specific implementations for halting the program threads are shown in FIGS. 6 and 8, and are discussed in more detail below. If the debugger event is a user breakpoint hit (step 530=YES), and if the breakpoint should fire (step 540=YES), method 350 returns (step 560). If the debugger event is a user breakpoint hit (step 530=YES), and if the breakpoint should not fire (step 540=NO), the other event is processed (step 550). If the event should stop the continue by the debugger (step 550=Stop Continue), method 350 loops back to step 510 and continues. If the event should allow completion of the continue (step 550=Complete Continue), method 350 returns (step 560). If the debugger event was not a user breakpoint hit (step 530=NO), the event is processed in step 550 as described above.

A first suitable implementation for step 440 in FIGS. 4 and 5 for halting program threads is shown as method 440A in FIG. 6. The debugger builds a thread list of all active threads (step 610). One suitable example of a thread list is shown as 210 in FIG. 2. The thread list preferably includes multiple entries, with each entry uniquely identifying each thread and identifying the code currently being executed by the thread. For all threads in the thread list that are executing user code, the debugger holds the thread and removes the thread from the thread list (step 620). The disclosure and claims herein distinguish between "user code" and "system code." The term "user code" means any code in the program being debugged (such as program 123 in FIG. 1). The term "system code" means any code that is external to the program being debugged that is called by the program being debugged. For example, programs can access services provided by an operating system kernel by making calls to the operating system kernel. When the program is executing its own instructions, the program is executing "user code." When the program is executing instructions in the operating system kernel external to the user code that were called from the user code, the program is executing "system code." Note that system code can include an operating system kernel, language runtime code, as well as code for services like maintaining a database or file system. For all threads in the thread list that are executing system code, the debugger delays holding those threads (step 630). The debugger delays holding these threads until some specified delay condition is satisfied (step 640=YES). The debugger then holds the remaining threads and removed them from the thread list (step 650).

Figure 7:
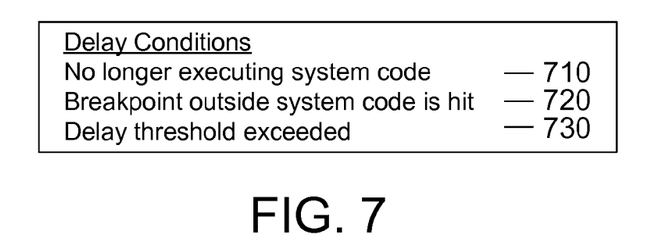
FIG. 7 is a block diagram showing sample delay conditions.

Three suitable delay conditions that could be used in method 440A and in step 640 are shown in FIG. 7. The first delay condition 710 is the thread is no longer executing system code. This could be determined, for example, by periodically sampling the thread to determine the code the thread is currently executing. The second delay condition 720 is when a breakpoint outside the system code is hit. For example, the debugger, instead of periodically sampling the thread, could set breakpoints in the user code at all exit points from the system code. Thus, when one of these breakpoints is hit, this means the thread has exited the system code. The third delay condition 730 is some delay threshold is exceeded. The delay threshold may be selected to have a value such that all threads will have time to exit the system code almost all of the time. The delay threshold value is selected so the debugger can get hold of a thread even if the thread is still executing system code. While there is still some small chance of creating a deadlock condition in the debugger by the debugger holding a thread that is executing system code, by putting the delay threshold in place, that small chance is minimized while always assuring the debugger will eventually hold all threads. The three delay conditions shown in FIG. 7 are shown by way of example, and are not limiting. The disclosure and claims herein expressly extend to any suitable delay condition that could be used by the debugger to delay holding threads that are executing system code.

A second suitable implementation for step 440 in FIGS. 4 and 5 for halting program threads is shown as method 440B in FIG. 8. The debugger builds a thread list of all active threads (step 810), such as thread list 210 in FIG. 2. A variable Count is initialized to zero (step 820). Count is then incremented by one (step 830). Count is then compared to a predefined threshold (step 840). When count is less than or equal to the predefined threshold (step 840=NO), the threads in the thread list are processed. For each thread in the thread list (step 850), if the thread is currently executing system code (step 852=YES), the debugger sets breakpoints in the user code at all exits of the system code (step 858). If the thread is not currently executing system code (step 852=NO), the debugger holds the thread (step 854), and the thread is removed from the thread list (step 856). If the thread list is empty (step 860=YES), method 440B returns (step 870). If the thread list is not empty (step 860=NO), method 440B loops back to step 830 and continues. Note the threshold in step 840 is preferably selected to have a value that will allow all threads that are executing system code to exit the system code almost all of the time. When the count exceeds the predefined threshold (step 840=YES), for each thread remaining in the thread list (step 880), the debugger removes the breakpoints for the thread that were set in step in step 858 (step 882), then holds the thread (step 884). The specified Count threshold assures the debugger will eventually hold all the threads, even if a thread does not exit the system code within the time specified by the threshold. Method 440B then returns (step 870).

The disclosure and claims disclose a debugger that includes a thread holding mechanism that analyzes each thread to determine the code being executed by each thread. The thread holding mechanism holds all threads that are not executing system code. For threads that are executing system code, the thread holding mechanism delays holding these threads until some specified condition is satisfied. The specified condition could be when the thread is no longer executing system code, when the thread encounters a breakpoint outside the system code, and when some time threshold expires.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method for a user to debug a program with a debugger, the method comprising the steps of:
   providing at least one processor;
   providing a memory coupled to the at least one processor;
   providing the program in the memory to be executed on a plurality of threads executed by the at least one processor, wherein the plurality of threads execute user code within the program and system code external to the program, wherein the system code performs services on behalf of the program;
   providing the debugger in the memory;
   the at least one processor executing the debugger, the debugger performing the steps of:
      executing the program; receiving a debugger event that specifies to halt execution of the program;
      analyzing the plurality of threads to determine whether any of the plurality of threads are currently executing the system code external to the program, immediately halting each of the plurality of threads that are executing user code within the program; and
      for each of the plurality of threads that are currently executing system code external to the program, delaying the halting of the thread by the debugger until at least one condition is satisfied.

2. The method of claim 1 wherein the at least one condition comprises the thread is no longer executing the system code external to the program.

3. The method of claim 1 wherein the at least one condition comprises exceeding a predetermined delay threshold.

4. The method of claim 1 wherein the at least one condition comprises encountering a breakpoint set by the debugger outside of the system code.

5. The method of claim 1 wherein the system code comprises operating system code.

6. The method of claim 5 wherein the operating system code comprises an operating system kernel.

7. A computer-implemented method for a user to debug a program with a debugger, the method comprising the steps of:
- providing at least one processor;
- providing a memory coupled to the at least one processor;
- providing the program in the memory, to be executed on a plurality of threads executed by the at least one processor, wherein the plurality of threads execute user code within the program and system code external to the program, wherein the system code performs services on behalf of the program;
- providing the debugger in the memory;
- the at least one processor executing the debugger, the debugger performing the steps of:
  - (A) executing the program;
  - (B) receiving a debugger event that specifies to halt execution of the program;
  - (C) analyzing the plurality of threads to determine whether any of the plurality of threads are currently executing the system code external to the program, immediately halting each of the plurality of threads that are executing user code within the program;
  - (D) for each of the plurality of threads that are currently executing the system code external to the program, delaying the halting of the thread by the debugger until at least one of the following conditions is satisfied:
    - (D1) the thread is no longer executing the system code external to the program;
    - (D2) a predetermined delay has elapsed; and
    - (D3) a breakpoint set by the debugger outside of the system code is encountered.

8. The method of claim 7 wherein the system code comprises an operating system kernel.

* * * * *